(12) United States Patent
Robinson

(10) Patent No.: US 7,008,304 B1
(45) Date of Patent: Mar. 7, 2006

(54) ABRASIVE AND DUST SEPARATOR

(75) Inventor: Robert A. Robinson, Glenwood, NM (US)

(73) Assignee: Media Blast & Abrasives, Inc., Brea, CA (US)

( * ) Notice: Subject to any disclaimer, the term of this patent is extended or adjusted under 35 U.S.C. 154(b) by 0 days.

(21) Appl. No.: 10/919,590

(22) Filed: Aug. 17, 2004

(51) Int. Cl.
*B24C 9/00* (2006.01)

(52) U.S. Cl. .............. 451/87; 451/75; 451/88; 451/89; 451/91; 451/99

(58) Field of Classification Search ............... 451/75, 451/87, 88, 89, 91, 99
See application file for complete search history.

(56) References Cited

U.S. PATENT DOCUMENTS

| 722,464 A | 3/1903 | Stevens |
| 1,751,719 A | 3/1930 | Uhri, Jr. |
| 2,324,250 A | 7/1943 | Voerge |
| 2,376,287 A | 4/1945 | Sorrentino |
| 2,376,616 A | 5/1945 | Oechsle et al. |
| 2,387,193 A | 10/1945 | Swenarton |
| 2,440,643 A | 4/1948 | Pettinos |
| 2,587,184 A | 2/1952 | Marjama |
| 2,669,809 A | 2/1954 | McGrath |
| 2,717,476 A | 9/1955 | Myers |
| 3,424,386 A | 1/1969 | Maasberg et al. |
| 3,906,674 A | 9/1975 | Stone |
| D239,155 S | 3/1976 | Kent |
| 3,953,184 A | 4/1976 | Stockford et al. |
| 3,970,437 A | 7/1976 | Van Diepenbroek et al. |
| 4,026,687 A | 5/1977 | Berz |
| 4,047,907 A | 9/1977 | Knutsson et al. |
| 4,099,937 A | 7/1978 | Ufken et al. |
| 4,140,502 A | 2/1979 | Margraf |
| 4,144,043 A | 3/1979 | Johnston |
| 4,156,600 A | 5/1979 | Jacobson |
| 4,201,256 A | 5/1980 | Truhan |
| 4,202,142 A | 5/1980 | Van Fossen |
| 4,223,748 A | 9/1980 | Barendsen |
| 4,230,468 A | 10/1980 | Rebours et al. |
| D257,774 S | 1/1981 | Pierson |
| 4,244,715 A | 1/1981 | Eisenbarth |
| 4,253,610 A | 3/1981 | Larkin |
| 4,266,673 A | 5/1981 | Haidlen et al. |

(Continued)

OTHER PUBLICATIONS

US 5,848,324, 12/1998, Matsumura (withdrawn)

*Primary Examiner*—George Nguyen
*Assistant Examiner*—Shantese McDonald
(74) *Attorney, Agent, or Firm*—Stetina Brunda Garred & Brucker

(57) ABSTRACT

Provided is a centrifuge media separator for separating blast particulate from fine particulate carried by air flowing from a blast cabinet and through the media separator. The centrifuge media separator comprises an upper panel, a lower panel, and an outer wall. The upper panel has a central opening formed therein. The outer wall is configured in a generally curvilinear shape and which extends between the upper and lower panels. The outer wall has at least one particulate escape aperture formed therein. The upper panel, lower panel and outer wall collectively define a curvilinear air passageway having an inlet and an outlet. The inlet is configured to allow a flow of air to enter the air passageway and circulate therethrough toward the outlet. The escape aperture is configured to exhaust the blast particulate out of the passageway. The central opening is configured to exhaust the fine particulate out of the passageway.

24 Claims, 2 Drawing Sheets

U.S. PATENT DOCUMENTS

| | | |
|---|---|---|
| 4,272,260 A | 6/1981 | Klein et al. |
| 4,275,531 A | 6/1981 | Van Fossen |
| 4,285,707 A | 8/1981 | Pfenninfer |
| 4,286,974 A | 9/1981 | Schminke |
| 4,330,400 A | 5/1982 | Schmidt |
| 4,336,040 A | 6/1982 | Haberl |
| 4,348,057 A | 9/1982 | Parenti et al. |
| 4,416,673 A | 11/1983 | Kirchen et al. |
| D274,851 S | 7/1984 | Schmitz |
| 4,543,111 A | 9/1985 | Muller et al. |
| 4,585,466 A * | 4/1986 | Syred et al. ............ 55/349 |
| 4,655,806 A | 4/1987 | Bowersox |
| 4,657,567 A | 4/1987 | Callgren et al. |
| 4,673,424 A | 6/1987 | Range |
| 4,771,580 A | 9/1988 | Male |
| 4,792,382 A | 12/1988 | Lorenz et al. |
| 4,878,927 A | 11/1989 | Margraf |
| 4,894,959 A | 1/1990 | Hoover |
| 4,984,397 A | 1/1991 | Van Leeuwen |
| 5,089,037 A | 2/1992 | Marsolais |
| 5,185,968 A | 2/1993 | Lyras |
| 5,221,300 A | 6/1993 | Hoogland et al. |
| 5,271,751 A | 12/1993 | Lagler |
| D343,706 S | 1/1994 | Gurstein |
| 5,312,040 A | 5/1994 | Woodward |
| 5,319,894 A | 6/1994 | Shank, Jr. |
| D352,808 S | 11/1994 | McNeil |
| D361,177 S | 8/1995 | Hoover |
| D370,490 S | 6/1996 | Zwicker |
| 5,584,901 A | 12/1996 | Bakharev et al. |
| 5,690,709 A | 11/1997 | Barnes |
| 5,716,260 A | 2/1998 | Griffin et al. |
| D394,526 S | 5/1998 | Strandell |
| 5,761,764 A | 6/1998 | Fiegel et al. |
| 5,800,246 A | 9/1998 | Tomioka |
| 5,839,951 A | 11/1998 | Tomioka |
| 5,975,996 A | 11/1999 | Settles |
| 5,983,840 A | 11/1999 | Riccius et al. |
| 6,051,054 A | 4/2000 | Ahman |
| 6,195,837 B1 | 3/2001 | Vanderlinden |
| 6,224,645 B1 | 5/2001 | Rydin et al. |
| 6,254,362 B1 | 7/2001 | Higuchi et al. |
| 6,319,295 B1 | 11/2001 | Tojner |
| 6,431,965 B1 * | 8/2002 | Jones et al. ............ 451/89 |
| 6,521,051 B1 | 2/2003 | Lutich |
| D476,668 S | 7/2003 | Storer |
| D482,827 S | 11/2003 | Storer |
| D482,828 S | 11/2003 | Storer |
| 6,833,016 B1 * | 12/2004 | Witter ............ 55/337 |

* cited by examiner

ABRASIVE AND DUST SEPARATOR

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

The present invention relates generally to blast cabinets and, more particularly, to a uniquely configured centrifuge media separator that may be included with the blast cabinet and which is specifically adapted to separate blast particulate from fine particulate such that the blast particulate may be recycled through the blast cabinet while the fine particulate may be removed from the blast cabinet in order to improve the visibility of a workpiece being blasted within the blast cabinet.

Blast cabinets are typically utilized to clean or generally prepare surfaces of a workpiece by directing high pressure fluid containing abrasive blast media or blast particulate toward the workpiece. The abrasive blast particulate is typically a relatively hard material such as sand, sodium bicarbonate (i.e., baking soda), metallic shot or glass beads although many other materials may be selected for use as the blast particulate. FIG. 1 illustrates a typical blast cabinet such as that which is commercially available from MEDIA BLAST & ABRASIVES, INC. of Brea, Calif. The blast cabinet typically includes a housing supported on legs. The housing defines a generally air tight enclosure having a pair of arm holes with gloves hermetically sealed thereto such that an operator may manipulate a blast hose and/or the workpiece for blasting thereof within the enclosure. The blast hose is configured to direct the high pressure fluid such as air carrying the blast particulate at high velocity toward the workpiece surfaces. The blast cabinet typically includes a transparent window to allow the operator to manipulate the workpiece and to visually observe the progress of the blasting.

During blasting, the blast particulate bounces off of the workpiece and is generally violently thrown about within the enclosure such that a portion of the blast particulate normally breaks down into smaller dust-like particles hereinafter referred to as fine particulate. In addition, surface coatings, dirt and scale that are abraded from the workpiece by the blast media contribute to the formation of fine particulate within the enclosure. The fine particulate is too small to be effective as a blast medium and therefore must be eventually removed from the blast cabinet. In addition, the fine particulate is of such small size such that it may be suspended in the air within the enclosure of the blast cabinet. Over time, the gradual buildup of the fine particulate can create a foggy or clouded environment within the enclosure which visually impairs or obstructs the operator's view of the workpiece. Due to health and safety regulations and environmental restrictions, the particulate-filled air cannot simply be exhausted to the atmosphere. Rather, the particulate-filled air must be filtered prior to exhaustion in order to remove the fine particulate carried therein.

Accordingly, many prior art blast cabinets are ventilated and include filters such that at least a portion of the fine particulate may be purged from the air. The filters may be configured as a replaceable cartridge filter or as a tube style filter. Regardless of its specific configuration, the filter traps the fine particulate during continuous exhaustion of the air from the enclosure. In this manner, visibility of the enclosure is enhanced such that the operator may more clearly observe the workpiece during blasting. Unfortunately, gradual buildup of the fine particulate on the filter reduces its filtering efficiency such that the filter must be periodically cleaned and/or replaced. In addition to filtering the fine particulate, the filter may also trap some of the blast particulate. The gradual buildup of the blast particulate increases the frequency of filter replacement. Furthermore, blast particulate which may otherwise be recycled is unintentionally discarded during replacement of the filter. Continuous supplementing of the blast particulate to replace the discarded blast particulate results in an increase in the operating cost of the blast cabinet.

As can be seen, there exists a need in the art for a simple blast cabinet having the capability to purge fine particulate from air prior to its exhaustion out of the enclosure in order to improve the operator's visibility of the workpiece within the enclosure. In addition, there exists a need in the art for a blast cabinet wherein blast particulate may be separated from fine particulate such that the blast particulate may be recycled through the blast cabinet. Furthermore, there exists a need in the art for a blast cabinet wherein the frequency of filter replacement is reduced such that the overall operating cost of the blast cabinet is reduced. Finally, there exists a need in the art for a blast cabinet wherein the incorporation of the centrifuge media separator eliminates the need for a filter.

BRIEF SUMMARY OF THE INVENTION

In accordance with the present invention, there is provided a centrifuge media separator for a blast cabinet. The centrifuge media separator separates the blast particulate from the fine particulate in order to purge the fine particulate from an interior of the blast cabinet so as to increase the visibility of a workpiece being blasted. In addition, the centrifuge media separator allows for reclaiming or recycling of blast particulate that has not been reduced into particulate of smaller size (i.e., fine particulate).

The blast cabinet may be comprised of a housing of generally inverted pyramid shape such that spent blast particulate may be funneled downwardly toward a lower portion of the housing for recycling. The housing has an enclosure with arm holes to which two gloves may be attached. The housing may also include a window such that an operator may reach though the arm holes to grasp and manipulate the workpiece during blasting. High pressure, high velocity fluid such as air acts as a carrier medium to carry blast particulate for high velocity discharge onto surfaces of the workpiece to remove coatings from or otherwise prepare the workpiece surfaces.

Mounted upon an upper portion of the housing may be the centrifuge media separator which has an air passageway through which the blast media may be drawn by a low pressure source such as a blower. The centrifuge media separator is fluidly connected to the enclosure of the blast cabinet. The low pressure source is fluidly connected to the centrifuge media separator and is configured to draw air into the inlet and exhaust air through the central opening such that the blast media may be drawn upwardly from the enclosure and into the air passageway wherein the blast particulate may be separated from the fine particulate. The blower is configured to ventilate the enclosure by providing low pressure in an area surrounding the centrifuge media separator. The low pressure provided by the blower draws spent portions of the blast media into the centrifuge media separator for subsequent separation into blast particulate and fine particulate.

The centrifuge media separator is comprised of an upper panel, a lower panel, and an outer wall extending between the upper panel and the lower panel. The upper panel has a central opening formed in a central portion thereof through which the fine particulate may be exhausted. Both the upper panel and the lower panel may be generally flat while the outer wall may be curvilinear and may be formed in a generally spiral configuration of generally decreasing radius. The inlet and the outlet of the air passageway may be generally located adjacent to one another with the outlet being disposed within the air passageway.

The outer wall may include at least one particulate escape aperture formed therein such that the blast particulate may be exhausted from the air passageway for subsequent recycling through the blast cabinet. An air foil may be mounted on the outer wall to facilitate exhaustion of the blast particulate through the escape aperture. The air foil may be a separate component that is mounted on the outer wall or it may be integrally formed with the outer wall. An extension may be mounted on the outer wall and may extend between the upper and lower panels in generally alignment with the outer wall such that the outlet is located downstream of the inlet. The extension may be included to prevent a reversal of flow through the air passageway. The air passageway may be configured such that its cross sectional area generally decreases along a direction of the flow of the air from the inlet to the outlet.

In operation, the centrifuge media separator 30 may be attached to the blower such that the blower creates an area of low pressure adjacent the central opening in order to draw air into the inlet. The air contains a combination of blast particulate and fine particulate. Because the air passageway 32 circles about itself in the generally spiral configuration, particulate having a density greater than the air (i.e., the blast particulate) is centrifugally directed toward the outer wall. Upon reaching the escape aperture, the blast particulate is exhausted from the air passageway.

Downstream of the escape aperture, the air circulating through the air passageway may contain fine particulate that may be drawn through the central opening formed in the upper panel due to the area of low pressure formed by the blower. The area of low pressure created by the blower is preferably such that fine particulate is drawn through the central opening while the larger size of the blast particulate prevents its passage through the central opening. Rather, the blast particulate recirculates through the air passageway and is redirected back to the inlet such that the blast particulate might pass through the escape aperture.

BRIEF DESCRIPTION OF THE DRAWINGS

An illustrative and presently preferred embodiment of the invention is shown in the accompanying drawings in which.

DETAILED DESCRIPTION OF THE INVENTION

Figure 1:
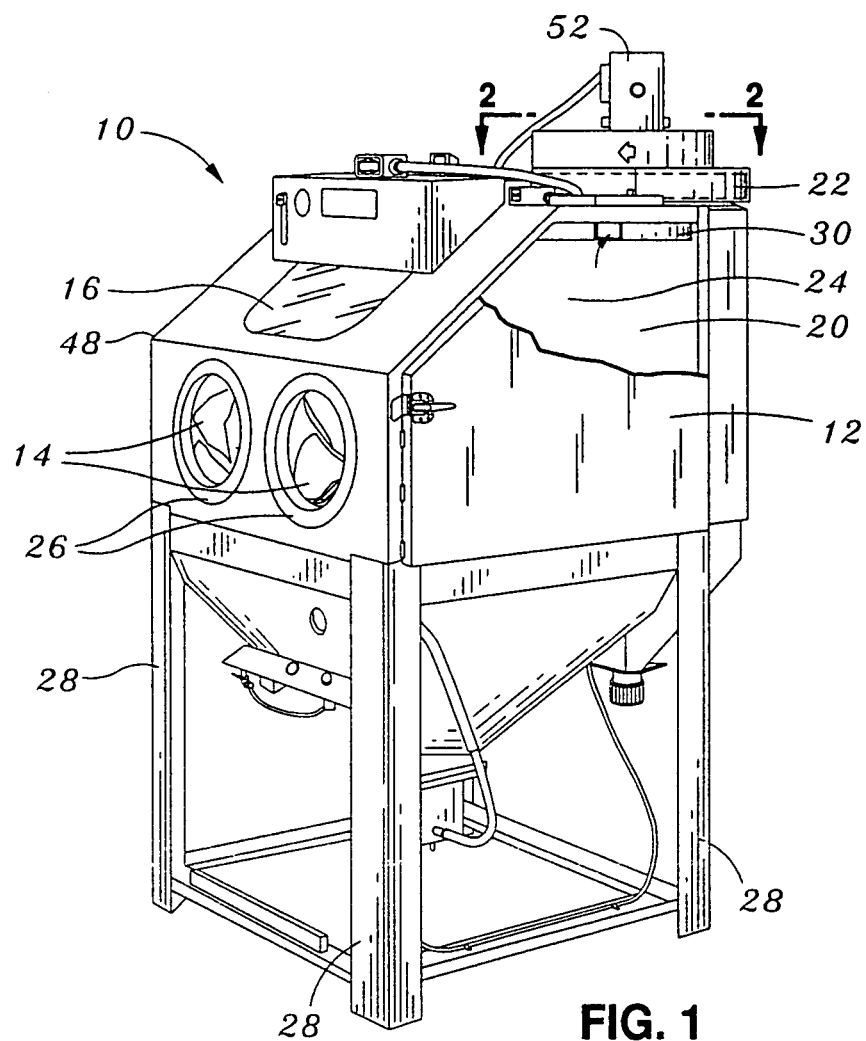
FIG. 1 is a perspective view of a blast cabinet having a centrifuge media separator of the present invention incorporated therein.

Referring now to the drawings wherein the showings are for purposes of illustrating the present invention only and not for purposes of limiting the same, the invention is directed to a centrifuge media separator 30 that is specifically configured to separate blast media. The blast media is generally comprised of blast particulate 18 and fine particulate 20. The centrifuge media separator 30 separates the blast particulate 18 from the fine particulate 20 in order to purge the fine particulate 20 from an interior of the blast cabinet 10 so as to increase the visibility of a workpiece 24 being blasted by a pressure hose (not shown) within the blast cabinet. In addition, the separation of the blast particulate 18 from the fine particulate 20 allows for reclaiming or recycling of the blast particulate 18 through the blast cabinet 10 in order to lower operating costs.

Referring to FIG. 1, shown is the blast cabinet 10 having the centrifuge media separator 30 of the present invention incorporated therein. The blast cabinet 10 may be comprised of a housing 48 supported on legs 46. The housing 48 may have a generally inverted pyramid shape such that spent blast particulate 18 may be funneled downwardly toward a lower portion of the housing-48 and subsequently picked up by the high pressure source (not shown) for recycling through the blast cabinet 10. The housing 48 has a generally air tight enclosure 12 with arm holes 26 to which two hermetically sealed gloves 14 may be attached. The housing 48 also includes a transparent window 16 such that an operator may reach though the arm holes 26 to grasp and/or manipulate the workpiece 24 during blasting thereof with the pressure hose.

The housing 48 of the blast cabinet 10 may also include at least one door (not shown) allowing access into the enclosure 12 such that the workpiece 24 may be inserted thereinto and removed therefrom. The pressure hose is a conduit for a high pressure, high velocity fluid. The fluid acts as a carrier medium and carries blast particulate 18 for high velocity discharge onto surfaces of the workpiece 24 in order to remove coatings from or otherwise prepare the workpiece 24 surfaces, as will be described in greater detail below. The fluid may be a gas such as air as may be utilized in the blast cabinet 10 of FIG. 1. However, the fluid may also be a liquid such as water. While the specific construction of the blast cabinet 10 is as shown in FIG. 1, it should be noted that the centrifuge media separator 30 may be utilized or incorporated into blast cabinets 10 and other similar devices of differing configurations.

The size of the blast particulate 18 and material from which the blast particulate 18 is fabricated is based upon the workpiece 24 to be blasted. The blast particulate 18 may be sand, sodium bicarbonate (i.e., baking soda), metallic shot, glass beads, etc. The blast particulate 18 may have a greater density relative to the carrier medium. In cleaning applications, the blast particulate 18 may be sand having a size of about sixty microns. When the sand blast particulate 18 is projected out of the pressure hose and onto the workpiece 24, a portion of the sand may break down into fine particulate 20 that is too small to be effective as a blast particulate 18.

Mounted upon an upper portion of the housing 48 may be the centrifuge media separator 30. The centrifuge media separator 30 has an air passageway 32 through which the blast media may be drawn by a low pressure source 52 such as a blower mounted on the blast cabinet 10. The centrifuge media separator 30 is fluidly connected to the enclosure 12 of the blast cabinet 10. The low pressure source 52 is fluidly connected to the central opening 36 and is configured to draw air into the inlet 34 and exhaust air through the central opening 36. In this manner, the blast media may be drawn upwardly from the enclosure 12 and into the air passageway 32 wherein the blast particulate 18 may be separated from the fine particulate 20. Optionally, a filter 22 may be provided with the blast cabinet 10 to filter excess amounts of fine particulate 20 leaving the air passageway 32 prior to exhaustion out of the blast cabinet 10. The blower may be mounted on the blast cabinet 10 above the centrifuge media separator 30. The blower is configured to ventilate the enclosure 12 by providing low pressure in an area surrounding the centrifuge media separator 30. The low pressure provided by the blower draws spent portions of the blast media into the centrifuge media separator 30 for subsequent separation into blast particulate 18 and fine particulate 20.

Figure 3:
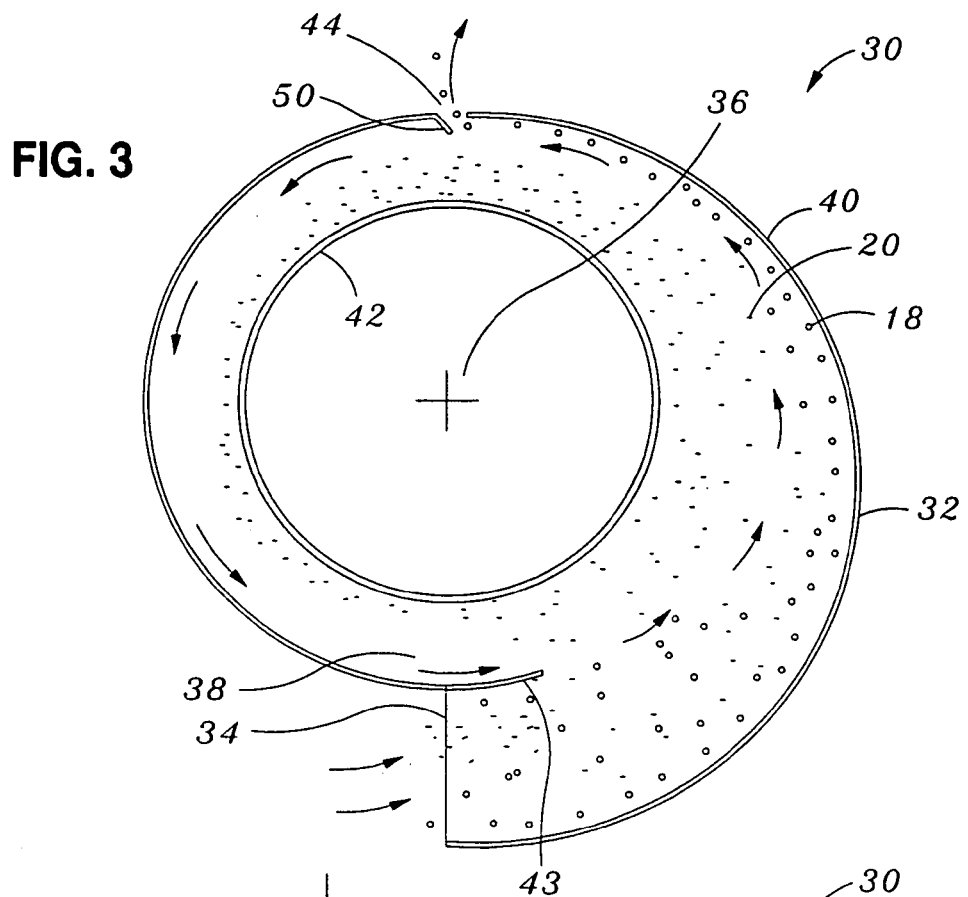
FIG. 3 is a plan view of the centrifuge media separator taken along line 3—3 of FIG. 2 and illustrating blast particulate centrifugally directed toward the outer wall and exiting at a particulate escape aperture.
Figure 4:
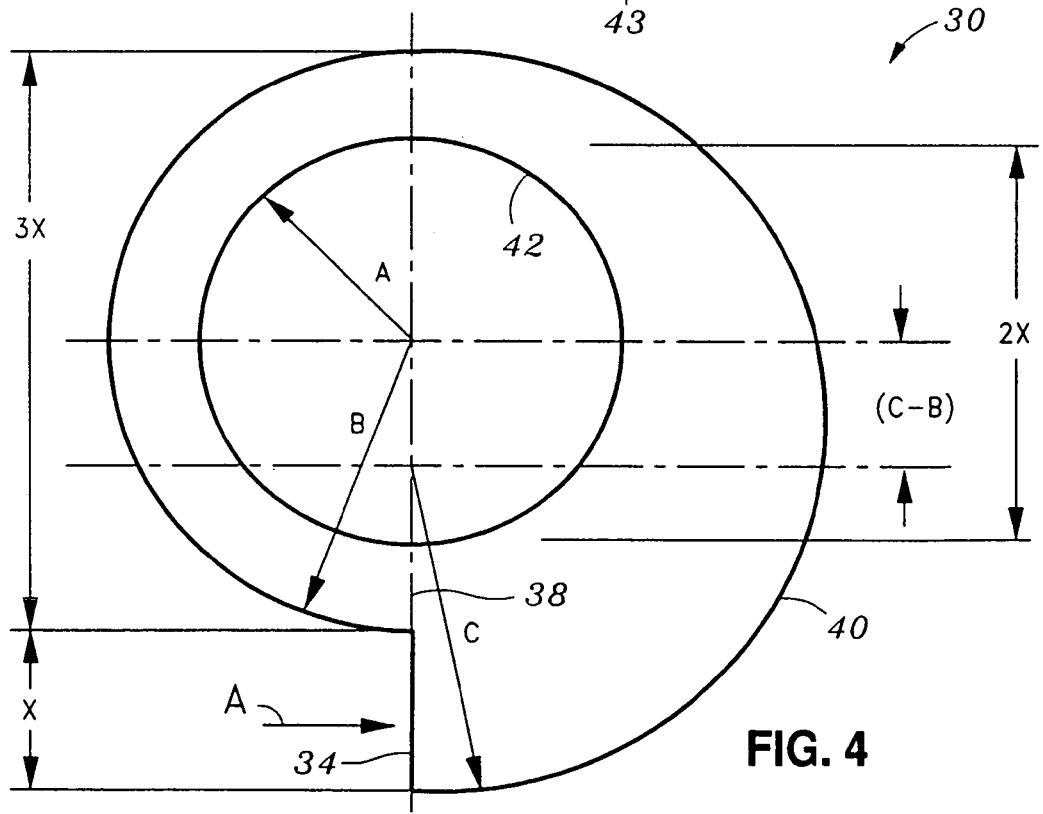
FIG. 4 illustrates relative dimensions of the centrifuge media separator that may facilitate movement of the blast particulate in the centrifugal direction.

Referring now more particularly to FIGS. 3–4, shown is the centrifuge media separator 30 of the present invention. The centrifuge media separator 30 allows for reclaiming or recycling of blast particulate 18 that has not been reduced into particulate of smaller size (i.e., fine particulate 20). As was earlier mentioned, such fine particulate 20 is not useful as blasting particulate 18 due to its relatively small size. The centrifuge media separator 30 allows for reclaiming or recycling of blast particulate 18 from the air. In this manner, the blast particulate 18 may not prematurely clog the filter 22, if included. As will be appreciated, such premature clogging of the filter 22 results in an increase in filter 22 maintenance or more frequent replacement of the filter 22.

As shown in FIGS. 3–4, the centrifuge media separator 30 is comprised of an upper panel 54, a lower panel 56, and an outer wall 40 extending between the upper panel 54 and the lower panel 56. The upper panel 54 may have a central opening 36 formed in a central portion thereof and through which the fine particulate 20 may be exhausted. The central opening 36 may be connected to the filter 22, if included. The central opening 36 may be circular as shown. Both the upper panel 54 and the lower panel 56 may be generally flat or substantially planar although alternative configurations of the upper rand lower panels 54, 56 are contemplated. The outer wall 40 may be curvilinear. As shown in FIGS. 3–4, the outer wall 40 may preferably have a spiral configuration of generally decreasing radius such that the air passageway 32 generally assumes a spiral configuration. The inlet 34 and the outlet 38 of the air passageway 32 may be generally located adjacent to one another with the outlet 38 being disposed within the air passageway 32.

Figure 2:
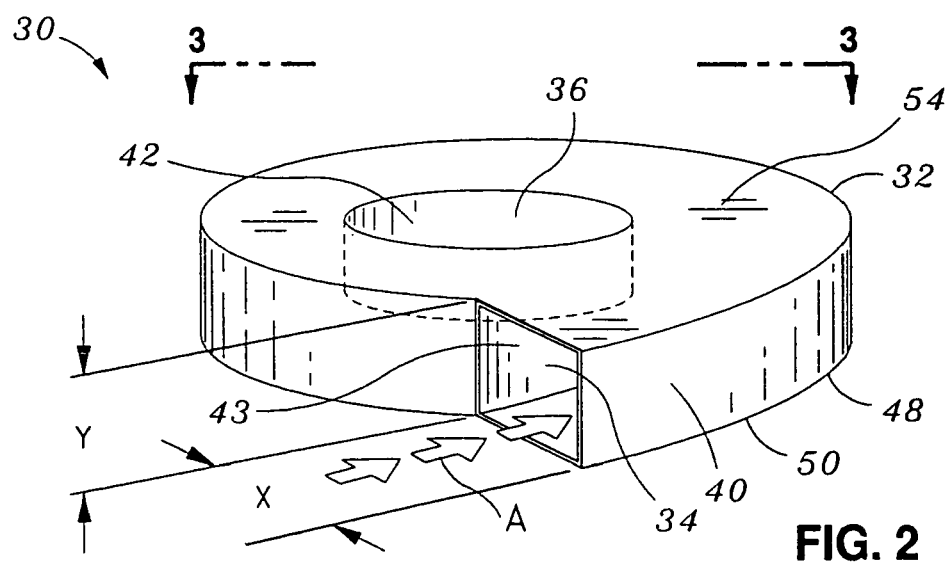
FIG. 2 is a perspective view of the centrifuge media separator in one embodiment having a spiral configuration for centrifugally directing blast particulate to an outer wall of the media separator.

Importantly, the outer wall 40 may include at least one particulate escape aperture 44 formed therein such that the blast particulate 18 may be exhausted from the air passageway 32 for subsequent recycling through the blast cabinet 10. The outer wall 40 may include an air foil 50 mounted thereon on a downstream side of the escape aperture 44. The air foil 50 may be configured to create a local area of low pressure adjacent the escape aperture 44. As shown in FIGS. 3–4, the air foil 50 may extend generally radially inwardly toward the central opening 36 and may span a distance between the upper and lower panels 54, 56. More specifically, the air foil 50 may be angled slightly inwardly in a direction generally opposite that of a direction of flow from the inlet 34 to the outlet 38. The direction of flow into the inlet 34 and within the air passageway 32 is indicated in FIG. 2 by the arrow A. As shown in FIG. 3, the air foil 50 may be oriented at an angle of about forty-five degrees relative to a tangent of the outer wall 40 at a location from which the air foil 50 may extend. However, it is contemplated that the air foil 50 may be provided in a variety of alternative configurations. Due to its shape and orientation in the air passageway 32, the air foil 50 may be configured to facilitate exhaustion of the blast particulate 18 through the escape aperture 44. The air foil 50 may be a separate component that is mounted on the outer wall 40. Alternatively, the air foil 50 may be integrally formed with the outer wall 40.

An extension 43 may optionally be included with the centrifuge media separator 30. Mounted on the outer wall 40, the extension 43 may extend between the upper and lower panels 54, 56 and may extend from and be disposed in general alignment with the outer wall 40 such that the outlet 38 is located downstream of the inlet 34 along a direction of the flow A. The extension 43 may be a separate component that extends from the outer wall 40 or the extension 43 may be integrally formed with the outer wall 40. By including the extension 43 with the centrifuge media separator 30, reversal of the flow A through the air passageway 32 may be minimized or prevented.

Referring still to FIGS. 2–4, the centrifuge media separator 30 may optionally include an inner ring 42 disposed radially inwardly relative to the outer wall 40. The inner ring 42 may be sized complementary to the central opening 36. For example, if the central opening 36 is circular, then the central opening 36 may preferably be cylindrically shaped and sized complementary to the circular shape of the central opening 36. The inner ring 42 may extend partially downwardly from the central opening 36. In this regard, the inner ring 42 may extend downwardly about one-quarter to about one-third of an overall height of the centrifuge media separator 30 although the inner ring 42 may extend downwardly in any amount. The overall height of the centrifuge media separator 30 is defined by a distance between the upper and lower panels 54, 56. By including the inner ring 42 with the centrifuge media separator 30, the operating efficiency thereof may be improved.

The upper panel 54, lower panel 56 and outer wall 40 collectively define the curvilinear air passageway 32 having an inlet 34 and an outlet 38. The inlet 34 may be rectangularly shaped due to the orthogonal relation of the upper and lower panels 54, 56 and the outer wall 40. Similarly, the outlet 38 may also be partially rectangularly shaped due to the orthogonal relation of the upper and lower panels 54, 56 and the outer wall 40 and inner ring 42. However, the inlet 34 may be configured in a variety of alternative shapes as may be provided by including an inlet 34 extension 43 of, for example, cylindrical shape. Conversely, the outlet 38 configuration may be generally determined by the shape of the upper and lower panels 54, 56 and the shape of the outer wall 40 and inner ring 42. The inlet 34 is configured to allow a flow of air to enter the air passageway 32 and circulate therethrough toward the outlet 38.

As can be seen in FIGS. 2–4, the air passageway 32 is preferably configured such that a cross sectional area thereof generally decreases along a direction of the flow A from the inlet 34 to the outlet 38. The outlet 38 is disposed radially inwardly relative to and positioned downstream of the inlet 34 such that the flow of air enters the inlet 34, circulates through the air passageway 32, exits the outlet 38, and rejoins the flow of air entering the inlet 34. The escape aperture 44 is configured to exhaust the blast particulate 18 out of the passageway. In this regard, the escape aperture 44 may be preferably configured as a generally rectangularly shaped slot that extends from the upper panel 54 to the lower panel 56. The central opening 36 is configured to exhaust the fine particulate 20 out of the passageway when the low pressure source 52 is applied to an area surrounding the central opening 36 in the upper panel 54, as will be described in greater detail below. The centrifuge media separator 30 may be manufactured from material selected from the group consisting of wood, plastic, metal, stainless steel, steel, or other suitable material and any combination thereof.

Referring now more particularly to FIGS. 2 and 4, the centrifuge media separator 30 may be configured to produce an air inlet 34 velocity of between about two thousand to about six thousand five hundred cubic feet per minute. In order to produce such an air inlet 34 velocity, the centrifuge media separator 30 may be configured such that the inlet 34 has a square configuration with a size of about four inches in width indicated by "X" in FIG. 2, and five inches in height indicated by "Y" in FIG. 2. The outlet 38 may also have a square configuration having a size of about five inches in height and a width smaller than the width of the inlet 34. In this regard, the air passageway 32 may have a gradually decreasing cross sectional area along the direction of flow within the air passageway 32. However, as shown in FIG. 4, the centrifuge media separator 30 may be configured such that the cross sectional area of the air passageway 32 generally decreases from the inlet 34 to a point about halfway along a length of the air passageway 32. A remainder of the length of the air passageway 32 may have a generally constant cross sectional area, as shown in FIG. 4.

In use, the centrifuge media separator 30 may be attached to the blower as mentioned above. The blower creates an area of low pressure adjacent the central opening 36 and in an area adjacent the inner ring 42, if included with the centrifuge media separator 30. The area of low pressure draws air into the inlet 34. As was earlier mentioned, the air contains a combination of blast particulate 18 and fine particulate 20. Because the centrifuge media separator 30 is configured such that the air passageway 32 circles about itself, particulate having a density greater than the air (i.e., the blast particulate 18) tends to be centrifugally directed toward the outer wall 40. The blast particulate 18 may circulate within the centrifuge media separator 30 in a sliding manner against the outer wall 40.

When the blast particulate 18 reaches the escape aperture 44, the blast particulate 18 is exhausted from the air passageway 32. A pressure differential may exist between an inside and outside of the air passageway 32 at an area adjacent the escape aperture 44. The outside of the air passageway 32 may have a lower pressure compared to that on the inside of the air passageway 32 such that the blast particulate 18 is drawn to the outside of the air passageway 32. Once outside of the air passageway 32, gravity may draw the blast particulate 18 downwardly into a blast particulate 18 hopper such that the blast particulate 18 can be reused. The pressure differential between the inside and outside of the air passageway 32 may be increased with the addition of the air foil 50 such that the separating efficiency of the centrifuge media separator 30 is enhanced.

Downstream of the escape aperture 44, the air circulating through the air passageway 32 may contain fine particulate 20. The air with fine particulate 20 may be drawn through the central opening 36 formed in the upper panel 54 due to the application of low pressure by the blower. If the centrifuge media separator 30 includes an inner ring 42, the air may pass under and around the inner ring 42 such that it may be drawn upwardly through the central opening 36. The low pressure may be sufficient to draw air with fine particulate 20 through the central opening 36 but not insufficient to draw the blast particulate 18 therethrough. As such, the blast particulate 18 downstream of the escape aperture 44 may be recirculated through the air passageway 32 and redirected back to the inlet 34 such that the blast particulate 18 might pass through the escape aperture 44.

FIG. 4 illustrates preferred relative dimensions of the centrifuge media separator 30 wherein X represents a unit of measurement equivalent to the inlet 34 width. A major diameter of the outer wall 40 may be about three times the inlet 34 width. The inner ring 42 may have a diameter which is about two times the inlet 34 width. The in inner ring 42 may be generally coaxially aligned with the outer wall 40. Preferably, the inlet 34 air velocity is preferably about two thousand to about six thousand five hundred feet per minute. To achieve such a velocity, the volume of air passing through the air passageway 32 may be approximately five hundred cubic feet per minute. Under such geometrical constraints and with the inlet 34 being sized with a four inch width and a five inch height, the velocity of the air at the inlet 34 may be approximately thirty-five hundred feet per minute.

As stated above, the air passageway 32 may have a generally decreasing cross sectional area in a direction of flow A from the inlet 34 to the outlet 38. The decreasing cross sectional area of the air passageway 32 increases the air velocity as the air progresses downstream of the inlet 34. Preferably, the air flow is laminar once the air reaches the escape aperture 44 wherein the blast particulate 18 may be centrifugally directed to the outer wall 40 such that the blast particulate 18 may exit the particulate escape aperture 44.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A centrifuge media separator for separating blast particulate from fine particulate carried by air flowing from a blast cabinet through the media separator, the centrifuge media separator comprising:

an upper panel having a central opening formed therein;

a lower panel; and a curvilinear outer wall extending between the upper and lower panels and having at least one particulate escape aperture formed therein;

wherein the upper panel, lower panel and outer wall collectively define a curvilinear air passageway having an inlet and an outlet, the air passageway being configured such that a cross sectional area thereof generally decreases along a direction of the flow from the inlet to the outlet, the inlet being configured for allowing a flow of air to enter the air passageway and circulate therethrough toward the outlet, the escape aperture being configured to exhaust the blast particulate out of the passageway, the central opening being configured to exhaust the fine particulate out of the passageway.

2. The centrifuge media separator of claim 1 further comprising:

an inner ring disposed radially inwardly relative to the outer wall and being sized complementary to and extending downwardly from the central opening.

3. The centrifuge media separator of claim 2 wherein the inner ring is cylindrically shaped.

4. The centrifuge media separator of claim 1 wherein:
the outer wall has a spiral configuration of generally decreasing radius;
the outlet being disposed within the air passageway radially inwardly relative to and adjacent the inlet such that the flow of air enters the inlet, circulates through the air passageway, exits the outlet, and rejoins the flow of air entering the inlet.

5. The centrifuge media separator of claim 1 further comprising a low pressure source fluidly connected to the central opening and configured to draw air into the inlet and exhaust air through the central opening.

6. The centrifuge media separator of claim 5 wherein the low pressure source is a blower mounted on the blast cabinet.

7. The centrifuge media separator of claim 6 wherein the blower is sized to generate a velocity of between about 2000 to about 6500 feet per minute for air entering the inlet.

8. A centrifuge media separator for separating blast particulate from fine particulate carried by air flowing from a blast cabinet through the media separator, the centrifuge media separator comprising:
an upper panel having a central opening formed therein;
a lower panel;
a curvilinear outer wall extending between the upper and lower panels and having at least one particulate escape aperture formed therein; and
an air foil mounted on the outer wall adjacent to the escape aperture and extending generally radially inwardly toward the central opening, the air foil being configured to facilitate exhaustion of the blast particulate through the escape aperture;
wherein the upper panel, lower panel and outer wall collectively define a curvilinear air passageway having an inlet and an outlet, the inlet being configured for allowing a flow of air to enter the air passageway and circulate therethrough toward the outlet, the escape aperture being configured to exhaust the blast particulate out of the passageway, the central opening being configured to exhaust the fine particulate out of the passageway.

9. The centrifuge media separator of claim 8 wherein the air foil is disposed on a downstream side of the escape aperture.

10. The centrifuge media separator of claim 8 wherein the outer wall and the air foil are integrally formed as a unitary structure.

11. A centrifuge media separator for separating blast particulate from fine particulate carried by air flowing from a blast cabinet through the media separator, the centrifuge media separator comprising:
a substantially planar upper panel having a circularly shaped opening formed in a central portion thereof;
a substantially planar lower panel;
a curvilinear outer wall having a spiral configuration of generally decreasing radius, the outer wall extending between the upper and lower panels and having at least one particulate escape aperture formed therein;
an air foil mounted on the outer wall adjacent to the escape aperture and extending generally radially inwardly toward the central opening, the air foil being configured to facilitate exhaustion of the blast particulate through the escape aperture;
an extension extending between the upper and lower panels and extending from the outer wall such that the outlet is located downstream of the inlet along a direction of the flow for preventing a flow reversal at the inlet; and
a cylindrically shaped inner ring disposed radially inwardly relative to the outer wall and being sized complementary to and extending partially downwardly from the central opening;
wherein the upper panel, lower panel and outer wall collectively define a curvilinear air passageway having a rectangularly shaped inlet and a rectangularly shaped outlet, the inlet being configured for allowing a flow of air to enter the air passageway and circulate therethrough toward the outlet, the air passageway being configured such that a cross sectional area thereof generally decreases along a direction of the flow from the inlet to the outlet, the outlet being disposed radially inwardly relative to and positioned downstream of the inlet such that the flow of air enters the inlet, circulates through the air passageway, exits the outlet, and rejoins the flow of air entering the inlet, the escape aperture being configured to exhaust the blast particulate out of the passageway, the central opening being configured to exhaust the fine particulate out of the passageway.

12. The centrifuge media separator of claim 11 wherein the air foil is disposed on a downstream side of the escape aperture.

13. The centrifuge media separator of claim 12 wherein the outer wall and the air foil are integrally formed as a unitary structure.

14. The centrifuge media separator of claim 11 further comprising a low pressure source fluidly connected to the central opening and configured to draw air into the inlet and exhaust air through the central opening.

15. The centrifuge media separator of claim 14 wherein the low pressure source is a blower mounted on the blast cabinet.

16. A blast cabinet having a centrifuge media separator for separating blast particulate from fine particulate carried by air flowing from the blast cabinet and into the media separator, the blast cabinet having a housing defining an enclosure and being configured for blasting a workpiece disposed within the enclosure, the centrifuge media separator being mounted on the housing and comprising:
an upper panel having a central opening formed therein;
a lower panel; and
a curvilinear outer wall extending between the upper and lower panels and having at least one particulate escape aperture formed therein;
wherein the upper panel, lower panel and outer wall collectively define a curvilinear air passageway having an inlet and an outlet, the air passageway being configured such that a cross sectional area thereof generally decreases along a direction of the flow from the inlet to the outlet, the inlet being configured for allowing a flow of air to enter the air passageway and circulate therethrough toward the outlet, the escape aperture being configured to exhaust the blast particulate out of the passageway, the central opening being configured to exhaust the fine particulate out of the passageway.

17. The centrifuge media separator of claim 16 further comprising:
an inner ring disposed radially inwardly relative to the outer wall and being sized complementary to and extending partially downwardly from the central opening.

18. The centrifuge media separator of claim 17 wherein the inner ring is cylindrically shaped.

19. The centrifuge media separator of claim 16 wherein:
the outer wall has a spiral configuration of generally decreasing radius;
the outlet being disposed within the air passageway radially inwardly relative to and adjacent the inlet such that the flow of air enters the inlet, circulates through the air passageway, exits the outlet, and rejoins the flow of air entering the inlet.

20. The centrifuge media separator of claim 16 further comprising a low pressure source fluidly connected to the central opening and configured to draw air into the inlet and exhaust air through the central opening.

21. The centrifuge media separator of claim 20 wherein the low pressure source is a blower mounted on the housing.

22. A blast cabinet having a centrifuge media separator for separating blast particulate from fine particulate carried by air flowing from the blast cabinet and into the media separator, the blast cabinet having a housing defining an enclosure and being configured for blasting a workpiece disposed within the enclosure, the centrifuge media separator being mounted on the housing and comprising:
an upper panel having a central opening formed therein;
a lower panel; and
a curvilinear outer wall extending between the upper and lower panels and having at least one particulate escape aperture formed therein;
an air foil mounted on the outer wall adjacent to the escape aperture and extending generally radially inwardly toward the central opening, the air foil being configured to facilitate exhaustion of the blast particulate through the escape aperture;
wherein the upper panel, lower panel and outer wall collectively define a curvilinear air passageway having an inlet and an outlet, the inlet being configured for allowing a flow of air to enter the air passageway and circulate therethrough toward the outlet, the escape aperture being configured to exhaust the blast particulate out of the passageway the central opening being configured to exhaust the fine particulate out of the passageway.

23. The centrifuge media separator of claim 22 wherein the air foil is disposed on a downstream side of the escape aperture.

24. The centrifuge media separator of claim 22 wherein the outer wall and the air foil are integrally formed as a unitary structure.

* * * * *